(12) United States Patent
Harviainen et al.

(10) Patent No.: US 11,184,599 B2
(45) Date of Patent: Nov. 23, 2021

(54) ENABLING MOTION PARALLAX WITH MULTILAYER 360-DEGREE VIDEO

(71) Applicant: PCMS Holdings, Inc., Wilmington, DE (US)

(72) Inventors: Tatu V. J. Harviainen, Helsinki (FI); Patrick Thomas Igoe, Philadelphia, PA (US)

(73) Assignee: PCMS Holdings, Inc., Wilmington, DE (US)

( * ) Notice: Subject to any disclaimer, the term of this patent is extended or adjusted under 35 U.S.C. 154(b) by 263 days.

(21) Appl. No.: 15/908,305

(22) Filed: Feb. 28, 2018

(65) Prior Publication Data

US 2018/0270464 A1    Sep. 20, 2018

Related U.S. Application Data

(60) Provisional application No. 62/471,602, filed on Mar. 15, 2017.

(51) Int. Cl.
*H04N 13/00*    (2018.01)
*H04N 21/218*    (2011.01)
(Continued)

(52) U.S. Cl.
CPC ......... *H04N 13/128* (2018.05); *H04N 13/194* (2018.05); *H04N 13/344* (2018.05);
(Continued)

(58) Field of Classification Search
CPC ............ H04N 21/2662; H04N 21/816; H04N 13/128; H04N 13/194; H04N 13/344;
(Continued)

(56) References Cited

U.S. PATENT DOCUMENTS 6,335,765 B1 *  1/2002  Daly .................. G06F 3/011
                                                    345/419
8,717,405 B2 *  5/2014  Li ...................... H04N 13/243
                                                    348/14.08
(Continued)

FOREIGN PATENT DOCUMENTS

WO    2009109804 A1    9/2009

OTHER PUBLICATIONS

Tao, Michael W., et al. "Depth from combining defocus and correspondence using light-field cameras", In: Proceedings of the IEEE International Conference on Computer Vision. 2013. p. 673-680.

(Continued)

*Primary Examiner* — Sath V Perungavoor
*Assistant Examiner* — Tyler B Edwards
(74) *Attorney, Agent, or Firm* — Invention Mine LLC

(57) ABSTRACT

Systems and methods are described for simulating motion parallax in 360-degree video. In an exemplary embodiment for producing video content, a method includes obtaining a source video, based on information received from a client device, determining a selected number of depth layers, producing, from the source video, a plurality of depth layer videos corresponding to the selected number of depth layers, wherein each depth layer video is associated with at least one respective depth value, and wherein each depth layer video includes regions of the source video having depth values corresponding to the respective associated depth value, and sending the plurality of depth layer videos to the client device.

20 Claims, 17 Drawing Sheets

(51) Int. Cl.
*H04N 21/2662* (2011.01)
*H04N 21/81* (2011.01)
*H04N 13/128* (2018.01)
*H04N 13/194* (2018.01)
*H04N 13/344* (2018.01)
*H04N 13/366* (2018.01)
*H04N 21/6587* (2011.01)
*H04N 21/2343* (2011.01)
*H04N 21/2387* (2011.01)

(52) U.S. Cl.
CPC ..... *H04N 13/366* (2018.05); *H04N 21/21805* (2013.01); *H04N 21/234327* (2013.01); *H04N 21/2662* (2013.01); *H04N 21/6587* (2013.01); *H04N 21/816* (2013.01); *H04N 21/2387* (2013.01)

(58) Field of Classification Search
CPC ....... H04N 21/234327; H04N 21/6587; H04N 13/366; H04N 21/21805; H04N 21/2387
See application file for complete search history.

(56) References Cited

U.S. PATENT DOCUMENTS

| | | | |
|---|---|---|---|
| 9,020,241 | B2 | 4/2015 | Leichsenring |
| 2005/0286759 | A1 | 12/2005 | Zitnick, III |
| 2010/0202540 | A1* | 8/2010 | Fang ...................... H04N 19/30 375/240.16 |
| 2012/0127284 | A1* | 5/2012 | Bar-Zeev .............. G06T 19/006 348/53 |
| 2013/0069932 | A1* | 3/2013 | Ha ....................... H04N 13/261 345/419 |
| 2016/0352791 | A1 | 12/2016 | Adams |

OTHER PUBLICATIONS

G. Petrovic, et. al. "Framework for Layered 3D Video Streaming", Jun. 8, 2006.

Heung-yeung Shum, et. al, "Rendering with concentric mosaics", Jan. 1, 1999.

* cited by examiner

ENABLING MOTION PARALLAX WITH MULTILAYER 360-DEGREE VIDEO

CROSS-REFERENCE TO RELATED APPLICATIONS

The present application claims priority under 35 U.S.C. § 119(e) from U.S. Provisional Patent Application No. 62/471,602, filed Mar. 15, 2017, entitled "ENABLING MOTION PARALLAX WITH MULTILAYER 360-DEGREE VIDEO," the entirety of which is incorporated herein by reference.

BACKGROUND

One technology currently used for cost-effective creation and delivery of visually rich virtual reality (VR) content is immersive 360-degree field of view video. Capturing and playback solutions for 360-degree video require capturing and rendering of full spherical views of the environment around the camera rig from one fixed viewpoint, or from two viewpoints in the case of stereoscopic 3D 360 video. Immersive video is a cost-effective solution for producing VR content by capturing audio and video from a live scene. One benefit of immersive video, also referred to as cinematic VR, is the simplicity of the playback compared with the real-time rendering of fully-synthetic 3D scenes. Even low-end VR devices, such as mobile phones with modest computing performance used as VR headsets together with cardboard holders, can play back cinematic VR content. This is due to the simplicity of cinematic VR rendering that enables streamed video to be projected to a spherical geometry around a single viewpoint. Viewpoint orientation is then synchronized with user head orientation using an inertial measurement unit (IMU).

Cinematic VR in its present form is generally limited to presenting a single static viewpoint position. Discrepancy between a user's real head motion and the fixed location of the viewpoint in the cinematic VR can break down the illusion of immersion. The fixed viewpoint causes discrepancy between a users head motions and visual feedback, which is one factor causing cyber sickness and lowering the overall quality of experience. Motion parallax, meaning the visual perception of objects at different distances moving at different speeds compared with each other, can be a stronger depth cue than stereopsis. Motion parallax is thus a substantial part of how a user perceives dimensions of his surrounding reality. Motion parallax resulting from the translation of the viewpoint inside the content provides a strong depth cue and has a significant impact on the feeling of immersion.

Even with the development of next generation capturing solutions, limited bandwidth of data connections between viewer clients and content servers, and limited computing performance of client devices, significantly limits the use of next-generation cinematic VR content, because freedom to move inside the captured VR content comes at price of extremely large memory consumption and heavy computing requirements. Economical solutions to motion parallax issues are needed.

SUMMARY

Exemplary systems and methods described herein enable lightweight delivery and output of immersive content while maintaining the freedom of motion within a limited area of the content.

One such embodiment is directed to a method of producing video content. The method includes obtaining a source video, based on information received from a client device, determining a selected number of depth layers, producing, from the source video, a plurality of depth layer videos corresponding to the selected number of depth layers, wherein each depth layer video is associated with at least one respective depth value and each depth layer video includes regions of the source video having depth values corresponding to the respective associated depth value, and sending the plurality of depth layer videos to the client device. The at least one respective depth value associated with each depth layer video can be a range of depth values.

In another embodiment, the method also includes sending, to the client device, information identifying at least one associated depth value for each of the plurality of depth layer videos. The associated depth value of each depth layer video can be an average depth value.

In one embodiment of the method, each of the depth layer videos is a 360-degree video and the source video is a 360-degree video.

In one embodiment of the method, determining a selected number of depth layers based on information received from a client device can include receiving a selected number of layers from the client device, selecting a number of layers based at least in part on network conditions reported by the client device, selecting a number of layers based at least in part on processing capabilities of the client device, or negotiating a number of layers with the client device.

In another embodiment, the source video is captured at least in part by using one or more of a depth camera and a light field camera.

In one embodiment, the method also includes sending to the client device a bit mask identifying transparent regions of at least one of the depth layers.

Another method is directed to displaying video content at a client device. The method includes negotiating a selected number of depth layers with a content server, wherein the selected number of layers depends at least in part on network conditions of communication with the content server, receiving a number of depth layer video streams corresponding to the selected number of depth layers, tracking a head position of a user of the client device, mapping the depth layer video streams to a composite video according to the head position, and displaying the composite video.

In one embodiment, the method also includes receiving an associated depth for each of the depth layer video streams, wherein the mapping is further based on the respective associated depths.

In an embodiment, at least a portion of content in a first depth layer video stream is scaled up in size so as to obscure additional content in a second depth layer video stream.

In one embodiment, the selected number of depth layers is determined at least in part by processing capabilities of the client device.

In one embodiment, the depth layer video streams are 360-degree video streams and the composite video is a 360-degree video stream.

Another embodiment is directed to a content server. The content server includes a processor and a non-transitory computer-readable medium storing instructions operative to perform functions including: receiving a source video, and, based on information received from a client device, determining a selected number of depth layers, producing, from the source video, a plurality of depth layer videos corresponding to the selected number of depth layers, wherein each depth layer video is associated with at least one respective depth value, and wherein each depth layer video comprises regions of the source video having depth values corresponding to the respective associated depth value, and sending the plurality of depth layer videos to the client device. The client device can be virtual reality display.

DETAILED DESCRIPTION

Exemplary embodiments described herein provide systems and methods for delivery and playback of immersive video content. Some such systems and methods are lightweight in terms of needed content delivery bandwidth and computing performance but are nevertheless capable of providing a user with a sense of at least some degree of freedom of motion inside the content.

Overview of Exemplary Embodiments.

One method used by animators and in post production to create the illusion of motion parallax involves identifying different image layers corresponding to different distances and moving those layers at different speeds. Cartoon animations and two-dimensional (2D) side-scrolling games use the illusion of motion parallax.

Figure 1:
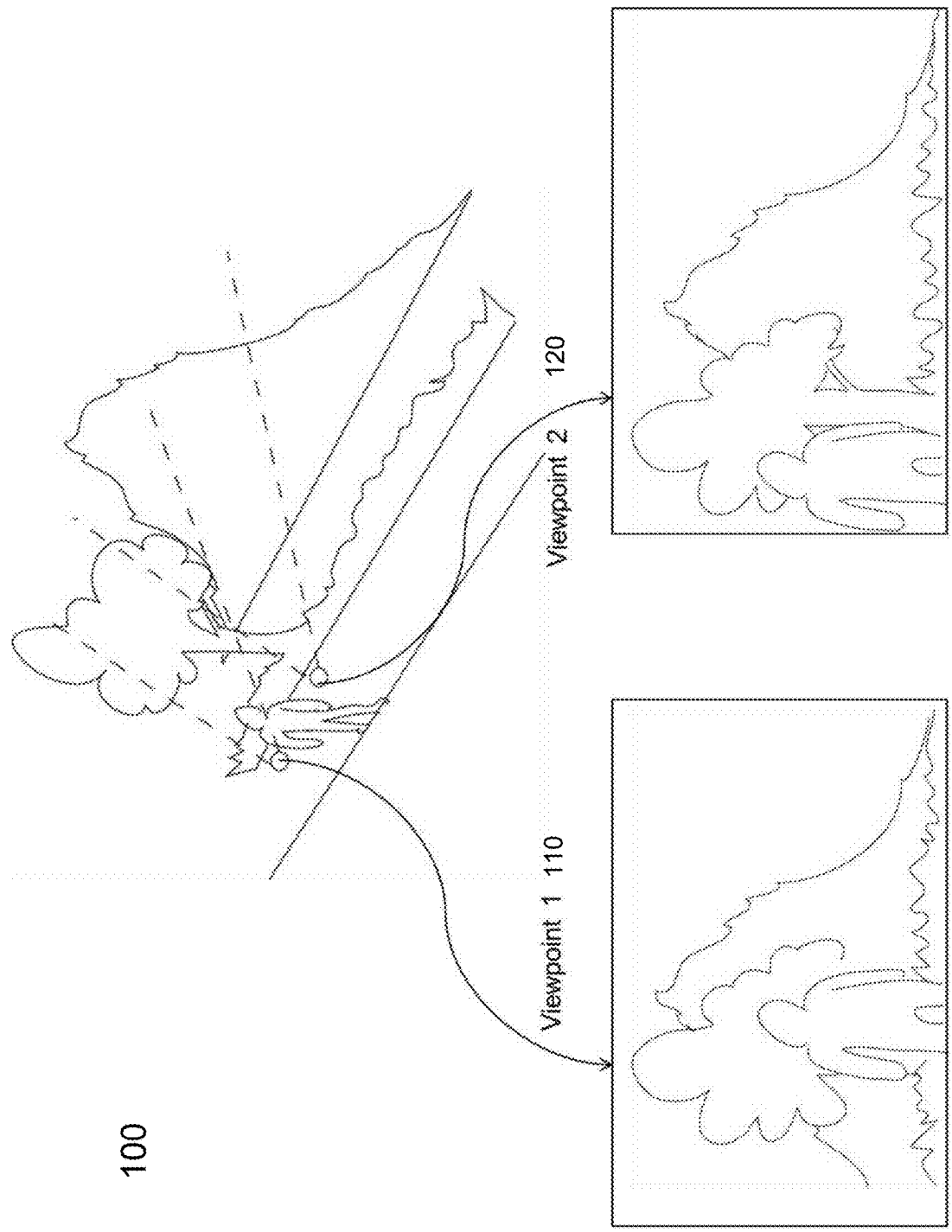
FIG. 1 labeled "Prior Art" is a schematic illustration of a prior art technique for creating an illusion of motion parallax using layers.

Referring now to FIG. 1, a diagram of a scene 100 with a first viewpoint 110 and a second viewpoint 120 illustrates how the illusion of motion parallax in a simple example using several layers, with different layers representing different depths.

In a method according to an exemplary embodiment, three-dimensional (3D) immersive content is divided into several spherical depth layers. Head tracking of a user is employed to determine viewpoint translation. Based on the viewpoint translation, the spherical depth layers are combined and displayed to a user to provide an approximation of the motion parallax that would be perceived by the viewer in the actual 3D environment from which the content was captured.

Figure 2:
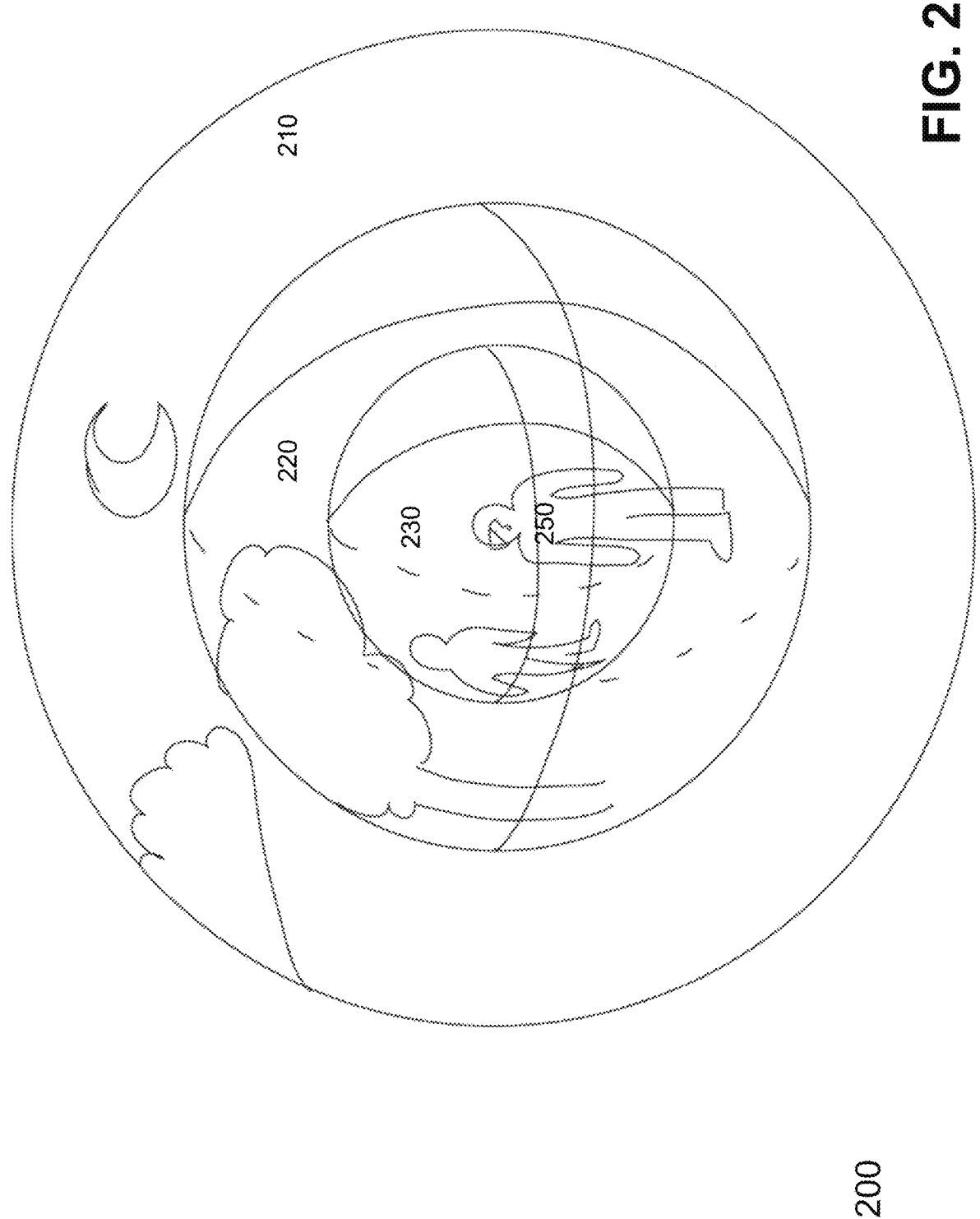
FIG. 2 is a schematic illustration of a 360-degree video that includes a plurality of depth layers in accordance with one or more embodiments.

FIG. 2 illustrates an example of spherical video 200 with several depth layers 210, 220 and 230. In this example image, a user 250 with a virtual reality (VR) head-mounted display (HMD) is illustrated at the center point of the different spherical video layers. Each spherical video layer 210, 220 and 230 contains content from different depths. In this illustration, the smallest sphere 230 contains images of persons in relatively close proximity to the viewpoint, the middle sphere 220 contains images of vegetation such as trees farther away from the viewpoint, and the largest sphere 230 contains images of distant background features such as clouds and the moon. When the user's viewpoint is moved around the center point according to the head tracking, multiple depth levels of spherical videos create the illusion of motion parallax.

Figure 3:
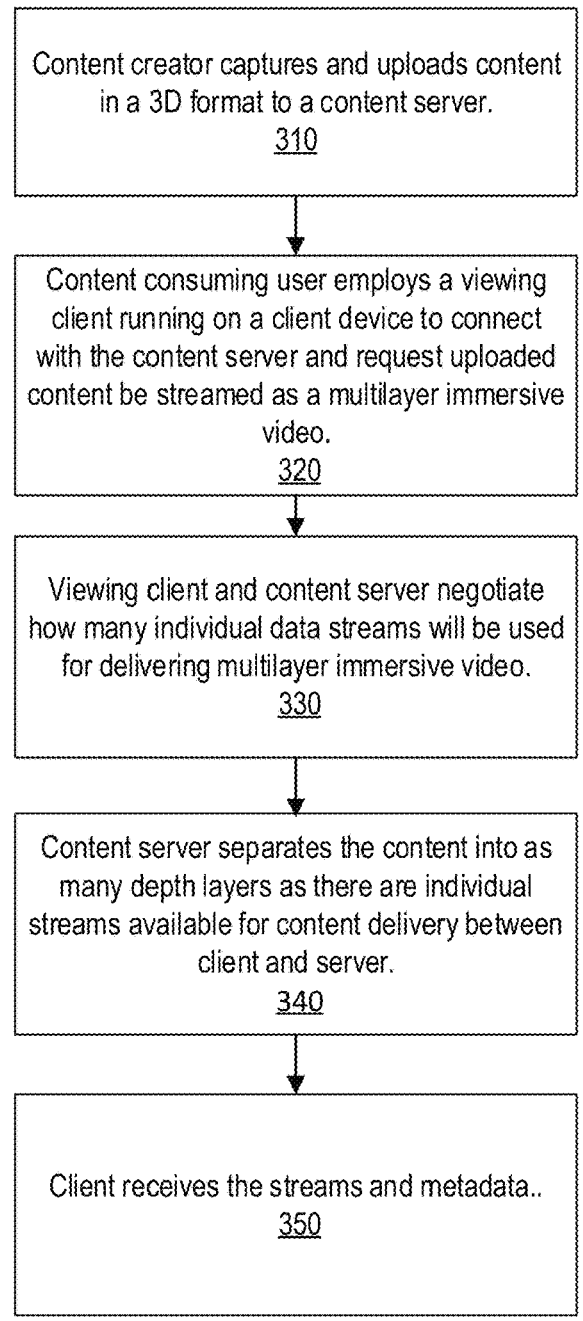
FIG. 3 is a flow diagram illustrating a method in accordance with one or more embodiments.

Referring now to FIG. 3, a flow diagram illustrates a method in accordance with an embodiment that provides for the appearance of motion parallax in visually rich 3D content with an embodiment. Block 310 provides for content creator to capture and upload content in a 3D format to a content server. The content may be a light field video, an immersive video with depth information, a fully synthetic 3D scene, or a video in other 3D formats. In block 320, the method provides for a content consuming user to employ a viewing client running on a client device to connect with the content server and to request uploaded content to be streamed as a multilayer immersive video. Block 330 provides for the viewing client and content server to negotiate how many individual data streams will be used for delivering the multilayer immersive video. The negotiating can be performed along with the request for uploaded content.

Block 340 provides for the content server to separate the content into as many depth layers as there are individual streams available for content delivery between client and server. In content separation, the server can select depth thresholds and separates elements based on their depth into separate layers. Within each layer, elements are at similar distances from the viewing point. The server renders each separated layer individually and streams the layers to the client along with metadata indicating the distance of each layer (e.g., the average distance of objects in the layer).

Block 350 provides for the client to receive the streams and the metadata. Based on the average distance, the client projects image streams received from the server to spheres that have a radius matching the depths indicated by the server. Multiple different sized spheres with matching center points can be layered on top of each other.

In one embodiment, alpha compositing may be used to indicate which areas within a sphere are transparent or semi-transparent.

In one embodiment, a client device tracks user head movement. Based on the tracked user head movement, the viewpoint is transformed around the center point of the spheres when rendering the content. Motion inside the spheres with different radiuses results in a user experiencing an approximation of the motion parallax as it would be visible if all elements were fully three-dimensional.

Exemplary embodiments provide a user with the freedom to move the viewpoint in an immersive content even with content that would not be possible to render in its original true 3D format due to the limited processing performance of the client device or in cases where limited bandwidth available for content delivery would cause original true 3D content not to be feasible to transmit in its original format.

Exemplary Systems and Methods.

Exemplary systems and methods described herein transform original 3D augmented reality (AR) and/or virtual reality (VR) content into a format that includes a plurality of spherical 360-degree video layers.

Figure 4:
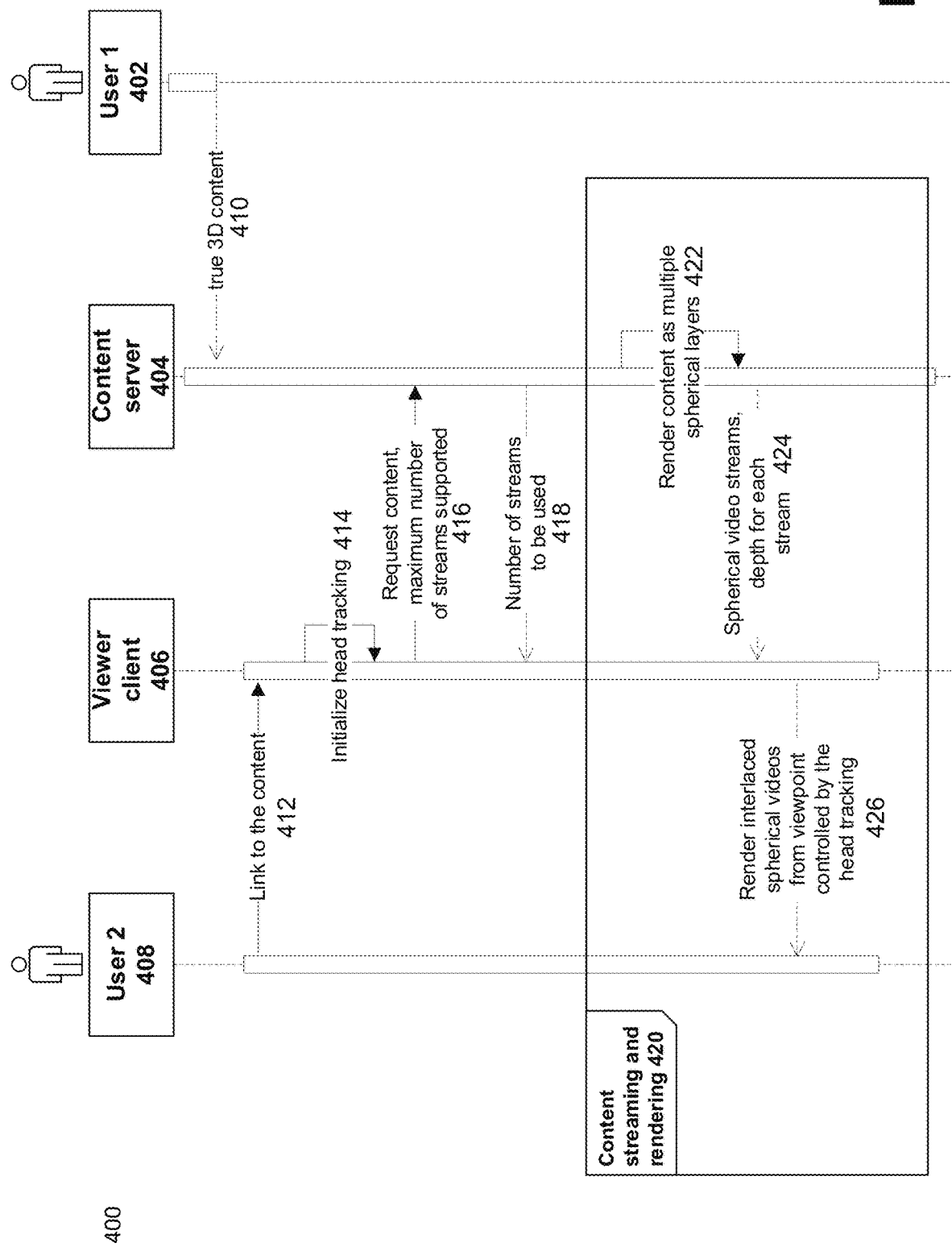
FIG. 4 is a message flow diagram illustrating an exemplary content delivery method in accordance with one or more embodiments.

Referring now to FIG. 4 is a message flow diagram 400 illustrates an overview of the entities and functions performed in an exemplary video session. As shown, User 1/content creator 402 uploads 3D video content 410 to the content server 404. A user's client device "viewer client" 402 can be coupled to User 2 408. User 2 408 can provide a link to the content 412 to a viewer client 406.

At viewer client 406, if a head tracking device is present, client 406 can initialize head tracking 414 and issue a request to the server to stream the content 416. The request can include a maximum number of streams supported. The content server 404 indicates at 418 the number of streams to be used.

Content streaming and rendering 420 provides that rendered content is created as multiple spherical layers 422 at the content server 404. Thus, content server 404 transforms the 3D video content into a format that includes two or more spherical video layers and streams those layers at 424 to the client for display. User 2 408 receives rendered interlaced spherical videos from viewpoint controlled by head tracking 426.

Content Production and Upload.

In a content production phase of an exemplary embodiment, the technique and content format used have an effect on how much freedom of motion the content allows. Freedom of motion is enabled for an area across which motion parallax is supported in the resulting virtual content.

With fully synthetic 3D content, full freedom of motion can be provided, as all the elements of the scene can be reproduced in their full appearance during run-time. However, with captured content using video cameras (and in some cases depth sensors), the capturing technique used can set limitations on how well motion parallax can be supported. To enable motion parallax, elements in the background contain visual information on the areas occluded by objects nearer the camera when inspected from just a single viewpoint. To capture the visual information occluded by the objects in the foreground, the visual content in some embodiments can be captured simultaneously from several viewpoints separated spatially from one another. For example, with light field cameras, an array of lenses each having some offset to one another may be used. When using light field capture, the background information may be stitched together from visual data seen by different lenses and 3D reconstruction done based on the combination of images. So in case of light field capture, the size of camera lens array, together with an algorithm used for constructing the final light field out of array of images produced by different lenses, imposes limitations on the area in which the viewer can change the viewpoint.

In addition to lens arrays used by light field cameras, in one embodiment, using two cameras with known offset and depth from stereo algorithms enables depth data collection based on just two different viewpoints, such as those illustrated in FIG. 1.

In some embodiments, with stereoscopic depth information and visual data from two different camera points, visual data is stitched together to allow some level of motion parallax. In this case, the motion parallax is best supported for head motions along the same direction that is used for offsetting the camera pair.

As an alternative (or in addition) to using multiple simultaneous capture points or geometry capture, capture of visual data enabling motion parallax can be performed in some embodiments by combining content captured at different times. One approach for capturing content to enable motion parallax is analysis of the captured content so that visual data for all elements in the scene is collected temporally. For example, different areas of objects can be visible for different camera locations, and these different areas may be stitched together.

A method performed in some embodiments for enabling motion parallax, and also for extending the available range of motion parallax, includes scaling of visual elements according to their distance from the viewpoint. When the size of an object closer to the viewpoint is increased, it covers greater area of the visual background, thus increasing the area that can be revealed to the viewer due to the motion parallax. In one variation to the solution, the content server extends motion parallax by performing a depth-dependent scaling automatically.

Referring back to FIG. 4, content may be uploaded to the content server from User 1 402 in various formats that contain information about the virtual environment so that viewing from several viewpoints can be created. Examples of such formats include light field video and mixed formats that combine spherical capture from multiple viewpoints and geometry reconstruction and fully synthetic 3D scenes. Content may also be uploaded and stored to the content server 404 in its original format. Once the content has been uploaded, other users like user 2 408 can request content from the content server 404.

Streaming Initialization.

A content consumption session may be initiated by a user, such as User 2 408, who requests that a viewer client 406 residing on the user's AR/VR device (e.g. an HMD) display certain content. Content to be displayed may be conveyed in the form of a link to the server and a reference to the specific content. The content may be identified using a URL, for example. In some embodiments, starting of the viewer client is handled automatically by the operating system based on the detection of the link type activated by the user, such as User 2 408. In some embodiments, the viewer client 406 is equipped with an application used to receive the content links, such as web browser or social media client.

Once the user 408 has started the viewing session, the viewer client 406 performs head tracking 414 which is used for accommodating content playback to the viewers head motions. The viewer client 406 also sends a content request (or requests) 416 to the content server 404. For head tracking, any suitable technique can be used such as, for example, visual tracking with a camera embedded with the display device, visual tracking of VR/AR headset with a camera monitoring the device from the environment, magnetic tracking, sonic tracking, gyroscopic tracking, or any combination of multiple tracking methods.

The viewer client 406 uses information on user head orientation and location to determine the viewpoint used for rendering the virtual content, thus enabling motion parallax.

At the streaming initialization, viewer client 406 and content server 404 negotiate to determine how many different depth layers the content is to be divided into. Each depth layer is rendered as an individual spherical video layer 424 by the content server 404 and streamed to the client 406 as an individual stream. In one embodiment of negotiation, at the session initialization, the viewer client 406 informs the content server 404 how many individual streams the client can handle 418. The maximum number of streams that can be used may be estimated by evaluating current network connection performance, processing power of the client device and other potential factors limiting the number of streams that can be used. The content server 404 may have information about a suitable number of depth layers for specific content. This information may be obtained as a result of a pre-evaluation of the content in which the content server inspects the content as a whole and estimates how many depth layers produces acceptable reproduction of motion parallax. Such information may also be generated manually (e.g. by a producer).

Once viewer client 406 and content server 404 have set the number of streams to be used for the session, the process moves on to the run-time phase which may be continuously executed for the duration of the content or until the session is terminated by some other event such as a user request to terminate content playback. Run-time processing is described in further detail below.

Run-Time Content Processing at the Server.

Once the number of depth layers to be used has been set, content server 404 begins to process the requested content. The goal of the run-time process on the server side is to find the best threshold values for depth values used for dividing the content to different depth levels. In some embodiments, threshold values are chosen so that as much depth variation as possible is maintained for each time step of the content while adjusting depth layer division to depth areas that are as clear as possible, such that major elements of content are not divided between layers. After depth threshold values have been chosen, the server renders content elements as two or more spherical video layers 422.

During rendering 422, depending on the original content type, the rendering process operates to render each depth layer as completely as possible, also rendering as much of areas occluded by elements in the foreground as possible. In the case of completely synthetic 3D scenes, this is trivial, as in the rendering of further away depth layers, elements in the foreground can be simply hidden, thus being able to render each depth layer completely. In the case of captured content, such as light fields, objects in the foreground can occlude the background so that not all visual content from the background occluded by the element in the foreground can be restored. In these cases, the rendering process combines renderings from different viewpoints included in the light field to cover as much of the background behind foreground elements as possible. When motion parallax is enabled, area of the background occluded by the foreground elements changes according to the changes in the viewpoint and therefore as much of the background should be available as possible.

With this approach, the content server 404 selects optimal depth threshold values for each time step of the content, divides content to different layers according to the depth of the elements, renders each depth layer as an individual spherical video 422, and streams the spherical videos to the viewer client 424. When rendering spherical videos at 426, as much of each depth layer data is included in the video frames as feasible.

In one embodiment, along with each depth layer rendered as spherical video, server 404 provides masking information identifying which of the pixels on that specific depth layer are to be visible and which are to be discarded when the depth layer is rendered by the client. The masking information may be included with the rendered spherical video 426 as alpha value included in the video as part of the per pixel data or it may be included as a separate mask layer.

In one embodiment, depth values used for dividing the content into depth layers may be directly inspected from fully synthetic 3D scenes, as well as from the content formats providing some level of 3D reconstruction of the captured environment. In the case of light fields, additional processing may be performed to derive depth values from the light field data. One approach that may be used to derive depth values is the technique described by Tao et al., "Depth from combining defocus and correspondence using light-field cameras," in: Proceedings of the IEEE International Conference on Computer Vision, 2013, p. 673-680, which content is incorporated herein in its entirety.

When content server 404 streams each spherical video representing one depth layer to the viewer client, along with the streams, the content server 404 informs viewer client of a depth corresponding to each depth layer (e.g. an average depth).

Rendering Process Executed by the Viewer Client.

Figure 5:
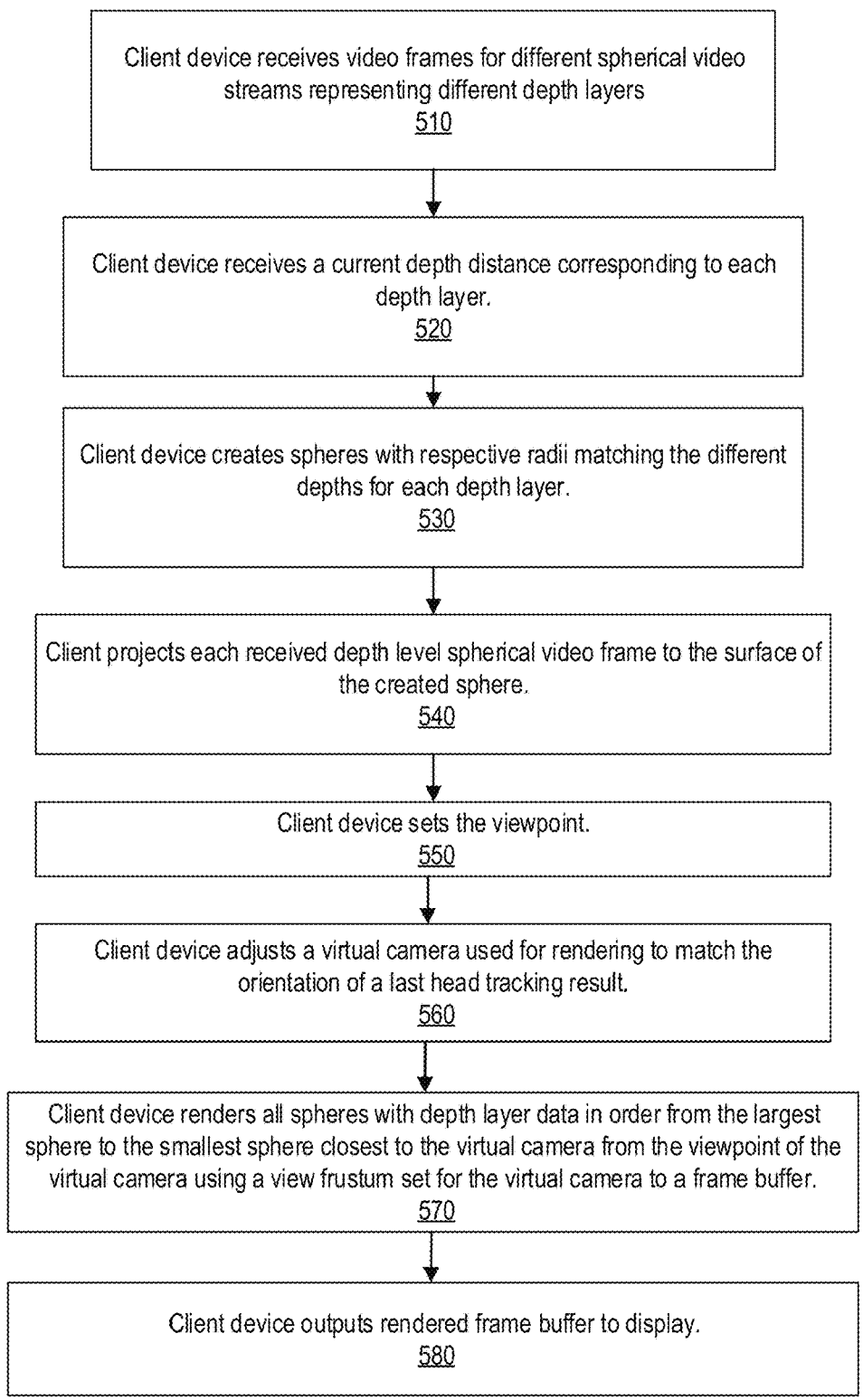
FIG. 5 is a flow diagram illustrating a method in accordance with one or more embodiments.

Referring now to FIG. 5, a flow diagram illustrates an exemplary rendering process executed by the client. The steps illustrated in FIG. 5 may be performed for each time step of the received stream content. More specifically, referring to block 510, a client device receives video frames for different spherical video streams representing different depth layers. Block 520 provides for the client device to receive a current depth distance corresponding to each depth layer.

Block 530 provides for the client device to create spheres with respective radii matching the different depths for each depth layer.

Next, block 540 provides for the client device to project each received depth level spherical video frame to the surface of the created sphere. For this purpose, 3D geometry and texture mapping functionalities provided by graphics programming application programming interfaces, (APIs) such as OpenGL and Direct3D can be used.

Block 550 provides for the client device to set the viewpoint, e.g. virtual camera offset from the center of the spheres according to the last head tracking result received from the head tracking.

Block 560 provides for the client device to adjust the virtual camera used for rendering to match the orientation of the last head tracking result.

Block 570 provides for the client device to render all spheres with depth layer data in order from the largest sphere to the smallest sphere closest to the virtual camera from the viewpoint of the virtual camera using a view frustum set for the virtual camera to a frame buffer. Preferably the view frustum of the virtual camera matches the field of view provided by the ARNR display device. While rendering spheres, for each sphere, set the transparency of each pixel according to the masking values included with the video data. Block 580 provides for the client device to output the rendered frame buffer to the display.

Although not explicitly stated, for sake of clarity, in the previous list of rendering process steps, the process described also can support rendering for display devices supporting binocular output. In case of binocular output, such as when separate images are produced for separate eyes to enable stereoscopic viewing, two viewpoint locations with slight offset render each output frame. The offset between the viewpoints can be the estimated or per-user measured interpupillary distance, meaning the distance between the centers of a user's pupils. Eye locations are set according to the location and orientation of the head given by the head tracking, so that the center of each viewpoint is as close as possible to the real location of the users eyes and pupils.

When rendering stereoscopic output, rendering performs full rendering steps for both viewpoints that represent the views of individual eyes. Thus, blocks 550, 560 and 570 are repeated for both eye views, and resulting output images are collected to the frame buffers according to the stereoscopic output format used by the viewing device. Exemplary stereoscopic frame buffer formats are, for example, left eye view to the left half of the frame buffer and right eye view to the right half of the frame buffer, or one eye view on the top half of the frame buffer and another on the bottom half. Alternatively, eye views may also be rendered to separate full frame buffers and sent to the display device sequentially or interleaved.

Additional Systems and Methods.

In embodiments described above, systems and methods are provided to provide the appearance of motion parallax using input from head tracking. In addition to motion parallax based on head tracking, exemplary embodiments can be used to enable light field rendering of multilayer spherical video content. In light field rendering, the same scene is drawn from multiple closely aligned viewpoints to recreate an array of images that estimate or sample the whole intensity and direction of visible light spectrum observed from a limited window or region in space. Similar methods described herein regarding transforming viewpoints based on the head tracking, in light field rendering, multiple viewpoints are rendered by transforming the viewpoint location according to the view array structure used by the display device outputting the light field. In this variation, light field rendering is produced without head tracking, so that motion parallax enabled by embodiments herein create multiple closely aligned views for the output of the light field on a light field display.

Embodiments directed to light filed rendering may also be used together with the head tracking embodiments such that the head tracking determines the overall location and orientation of the viewpoint to be displayed for the user viewing the light field display, and then on the next step multiple viewpoints required by the light field rendering are produced around that head tracking controlled initial viewpoint.

In one embodiment, content is captured iteratively using immersive 360 video capture from one static viewpoint. A 360-degree video capture device may be used. In a single recording session, the capture device may produce a single spherical video from single static viewpoint. However, using multiple recording sessions, different depth layers may be captured as different capture sessions, and they may be divided into different depth layers as a video post-processing step. For example, for cinematic virtual reality (VR), the environment farther away from the camera may be captured first, and then actors acting on the foreground may be captured as a second content capture session. In post-processing, the background may be extended to have the same duration as the foreground spherical video containing just the actors' performance on the foreground. From the spherical video containing the actors' performance in the foreground, background removal may be performed as a post-processing step. With this approach, the methods described herein may be used to enable motion parallax on immersive videos produced with capture devices not originally intended for capturing immersive video which would enable accommodation to head motion.

In another embodiment, a content server may mix different kinds of content during run-time to provide an immersive experience with motion parallax. For example, the static environment may be uploaded to the content server as a fully synthetic 3D model. The synthetic 3D model may be generated by a 3D artist, or it may be a model produced by reconstructing the environment geometry and textures from data captured from a real-world location using for example an RGB-D sensor. During run-time, the content server may render immersive content using techniques describe above by rendering a combination of 3D model of the static environment together with spherical video captured separately. The spherical video combined with the 3D model of the static environment may, for example, contain an actors performance for which the depth of the elements is approximately known.

The creation of simulated motion parallax as described herein using separate depth layers does not necessarily provide ideal results in all situations. For example, elements extending for large areas in the depth distance, such as a floor in the case of an indoor scene, can suffer from visual gaps when it is divided to several depth layers that move at different speeds when head motion causes motion parallax. In some embodiments, such large content elements extending for large distances in the depth axis are identified, and separate flat projection surfaces are created for them.

In some embodiments, the content server processes uploaded true 3D content as a pre-processing step immediately as soon as the content server receives the content. In this approach, the content server analyses the video to determine a number of depth layers producing good approximation of motion parallax for the whole content duration. Then, the content server renders and stores all depth layers using a previously estimated number of individual depth layers. In response to a viewing client requesting content pre-processed and already rendered as a number of spherical videos containing different depth levels, the content server streams all the spherical videos if client can receive all of them. In cases in which a client cannot receive the full number spherical videos used in pre-processing, the content server during run-time merges different layers with the least amount of depth variation between them during run-time to reduce the needed depth layer amount. Merged depth layers can be streamed to the client, thus reducing the number of needed layers to match the maximum number of different streams supported by a session.

In another alternative embodiment, the content server can detect uploaded content types that might suffer from limited range of visual data from different depth areas. For example, a light field captured with a very small sensor array may produce very limited area that can be used for motion parallax. Because simulated motion parallax requires that visual information be available from the background occluded by the objects closer to the viewing point, which then can be revealed to the viewer as the viewer moves his/her head, the amount of background information normally occluded by the foreground object generally determines the maximum area of motion parallax. One way to extend the area supported by motion parallax is to increase the visual size of the objects in the foreground so that they cover more of the background. In this embodiment, the content server scales all segmented elements of the content according to the segments average distance from the viewpoint before streaming the segmented layers to the client. Thus, visual elements closer to the viewer are scaled larger, thereby covering more background and enabling larger area available for motion parallax.

In some embodiments, the process is arranged to minimize the content processing that is performed by the client. In an alternative embodiment, some of the processing performed by the server is moved to the client side. In one embodiment, moving processing tasks to a client device balances the processing between server and client in situations when the client device has sufficient processing performance to perform some of the content processing locally. In one variation, the server instead of streaming the layered 360-degree video format, streams 360-degree spherical video together with the associated depth values to the client, and the client then separates the spherical video into several layers based on the depth values and creates background margins for use in motion parallax simulation by scaling the spherical layers according to the average depth or the order of the layers.

In a further embodiment, the server may stream stereographic 3D 360-degree video to the client, and the client then locally produces depth values for the video using depth determined from the stereo video. In such an embodiment, the client may produce depth values for the video, isolate spherical video to several layers, create margin to enable motion parallax by combining visual information for different depth layers from left/right eye view images and then increase the area of motion parallax by scaling the layers according to their respective average depth or order.

In a further alternative embodiment, all content processing may be moved from the server to the client. In such an embodiment, the client receives the content in a full 3D format, such as one of the 3D formats described above for processing by the server. The client may then process the content using the embodiments described herein with respect to the server to transform the 3D content into a multilayer 360-degree format. For example, in some cases a client may have required processing power, but the display device requires the content to be in a multilayer 360 format.
Exemplary Use Cases.

Figure 6:
FIG. 6 illustrates a light field video capture session with the capturing device at the center in accordance with one or more embodiments.
Figure 7:
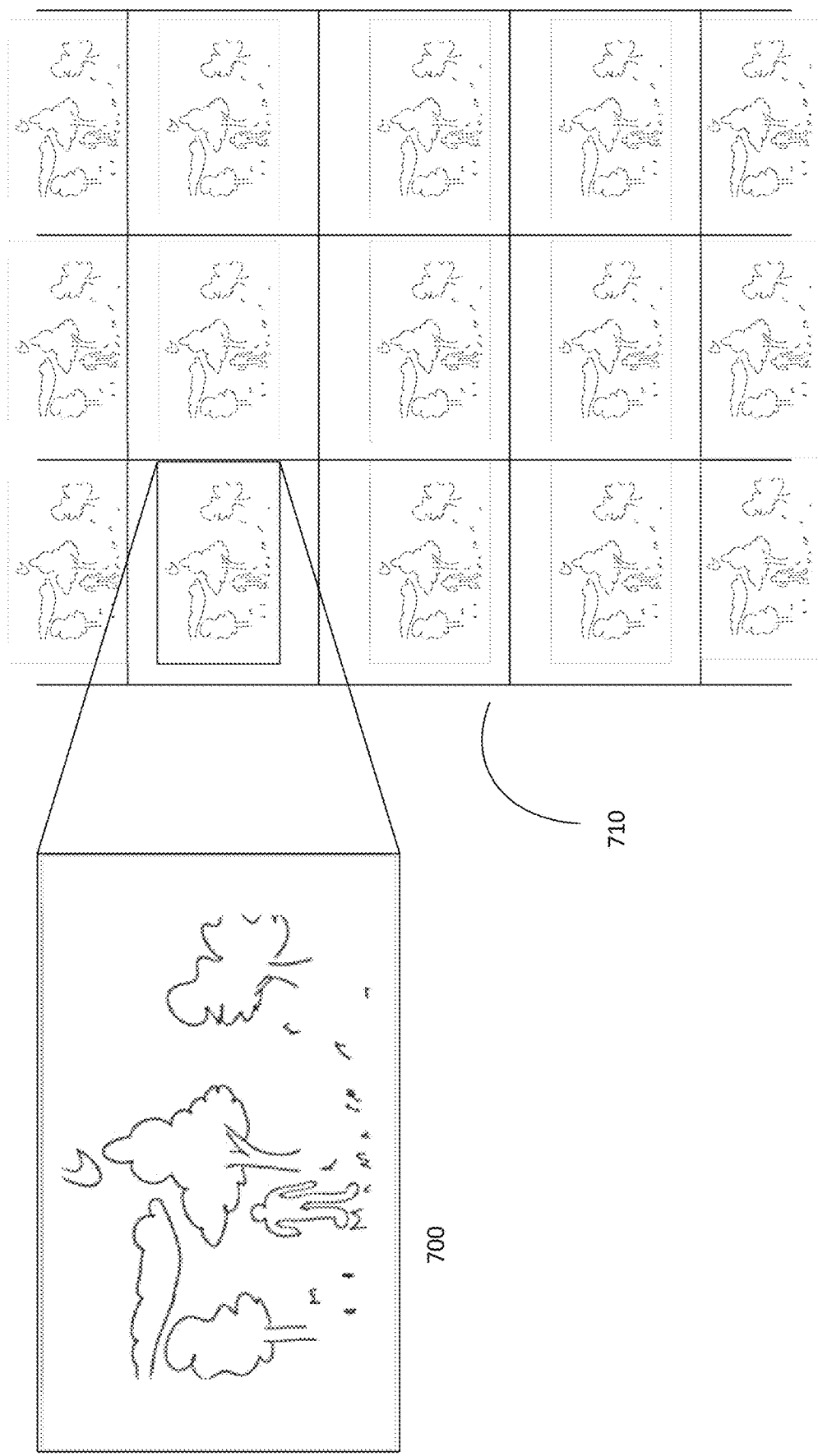
FIG. 7 is a schematic illustration of a captured light-field video in accordance with one or more embodiments.
Figure 8:
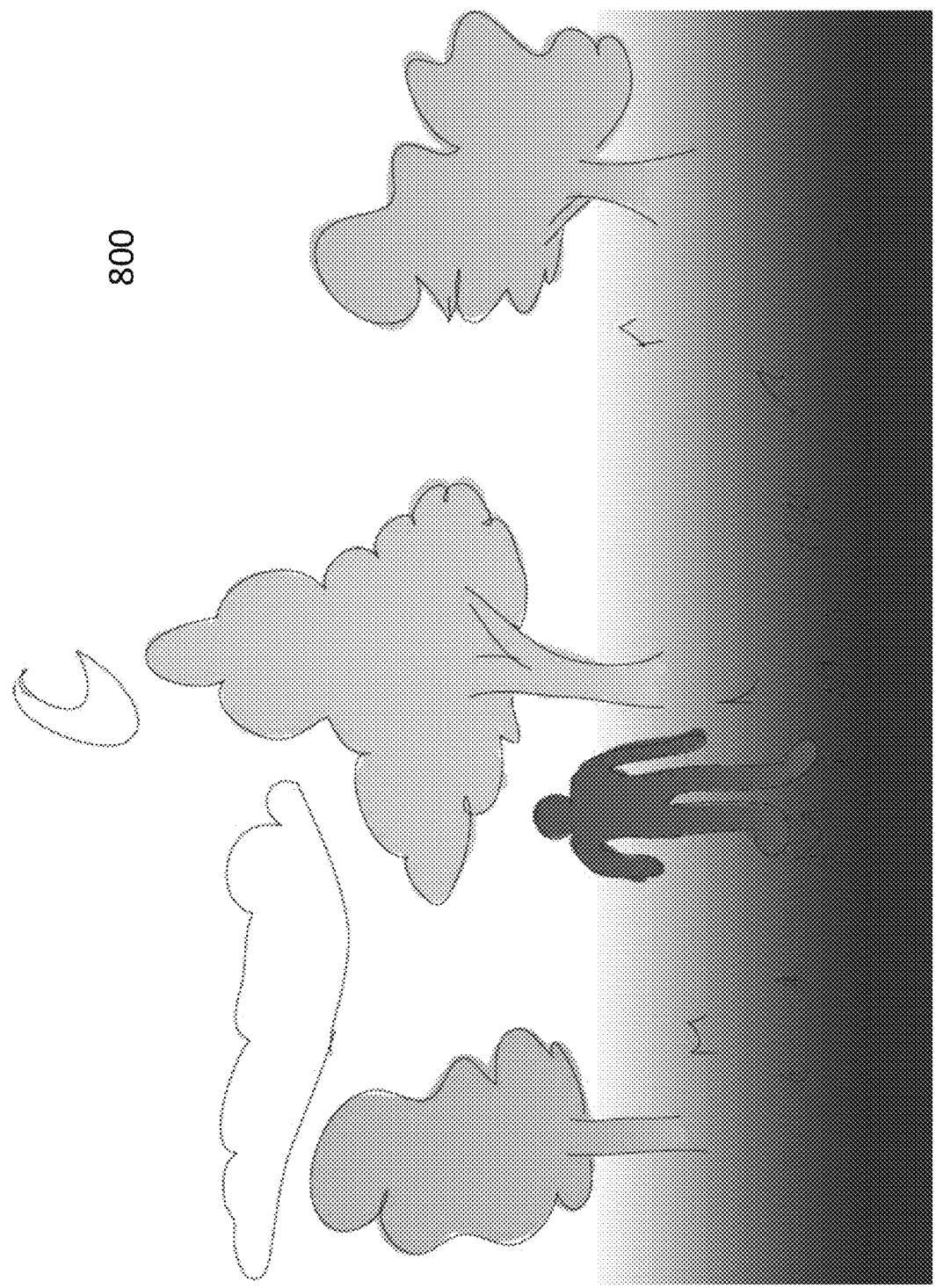
FIG. 8 is a schematic illustration of a depth map created for a captured scene from the light field data of FIG. 6 in accordance with one or more embodiments.

In one exemplary use case, a light field video is captured from an outdoor environment, as illustrated in FIG. 6. The light field video 600 includes an array of spherical videos, each captured from slightly different viewpoint, as illustrated schematically in FIG. 7 with video 700 being one of the array 710 of videos. Using the light field data, a content server produces a depth map of the scene. FIG. 8 illustrates depth map 800 created for the captured scene from the light field data, with lighter shades of grey corresponding to features that are more distant from the viewpoint.

In response to a viewing client requesting stored light field video for consumption, the server and client negotiate number of individual depth layer video streams to be used for content delivery. In this example, three different channels are going to be used. Based on the selected number of depth layers, the content server determines, for each content time step, appropriate depth level threshold values.

Figure 9:
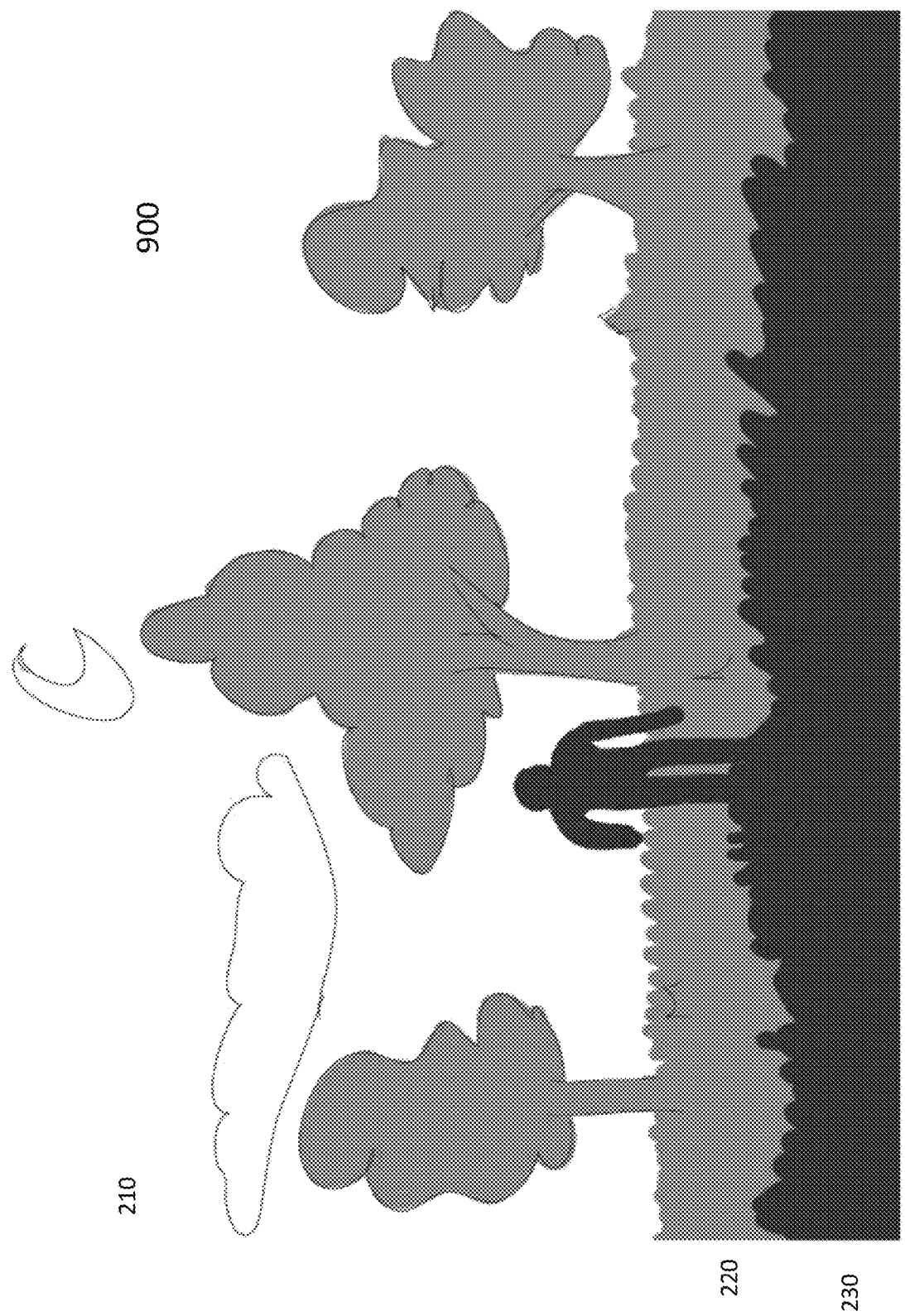
FIG. 9 is a schematic illustration of division of the content of FIGS. 7-8 into three different depth level in accordance with one or more embodiments.

Referring to FIG. 2 in combination with FIG. 9, the division of content to three different depth levels, 210, 220 and 230 with lighter shades of grey such as 220 and 210 corresponding to features that are more distant from the viewpoint.

Based on depth level thresholding, the content server renders a separate spherical video for each depth level, with each separate video containing as much of the visual information from that depth range as is feasible. In case of light field data, visual data may be collected from all of the images in the image array such as array 710 to cover as much of the visual data as feasible that otherwise would be occluded by other elements closer to the viewpoint if only inspected from image of single viewpoint. As a result, the content server renders frames for three different spherical videos, which are then streamed to the viewer client along with information on the depth level of each spherical video.

Thus, background data 210 including a moon and cloud can be streamed as Stream 1 with a maximum depth, medium depth 220 can be streamed as Stream 2 with an average depth of 400 centimeters, and foreground 210 can be streamed as Stream 3 with an average depth of 150 centimeters.

Referring back to FIG. 2, the spherical video representation 200 illustrates resulting spherical video frames to be streamed together with averaged depth values.

At the client side, the viewer client receives the image data streamed as three separate streams, adjusts the size of the projection spheres according to the received average depth values and projects received spherical video frames to the projection spheres for rendering, as illustrated in FIG. 2. At the same time, a viewer client also receives head tracking data from the head tracking solution, and accordingly adjusts viewpoint location and orientation in relation to the center point of the projection spheres.

The viewer client renders each depth layer using the viewpoint adjusted according to the head tracking from the most distant spherical video layer in order towards the closest spherical video layer to a render buffer. Once all layers have been rendered, the render buffer is sent to the display for output on the display device worn by the viewer.
Example of Image Capture, Processing, and Display.

Figure 10:
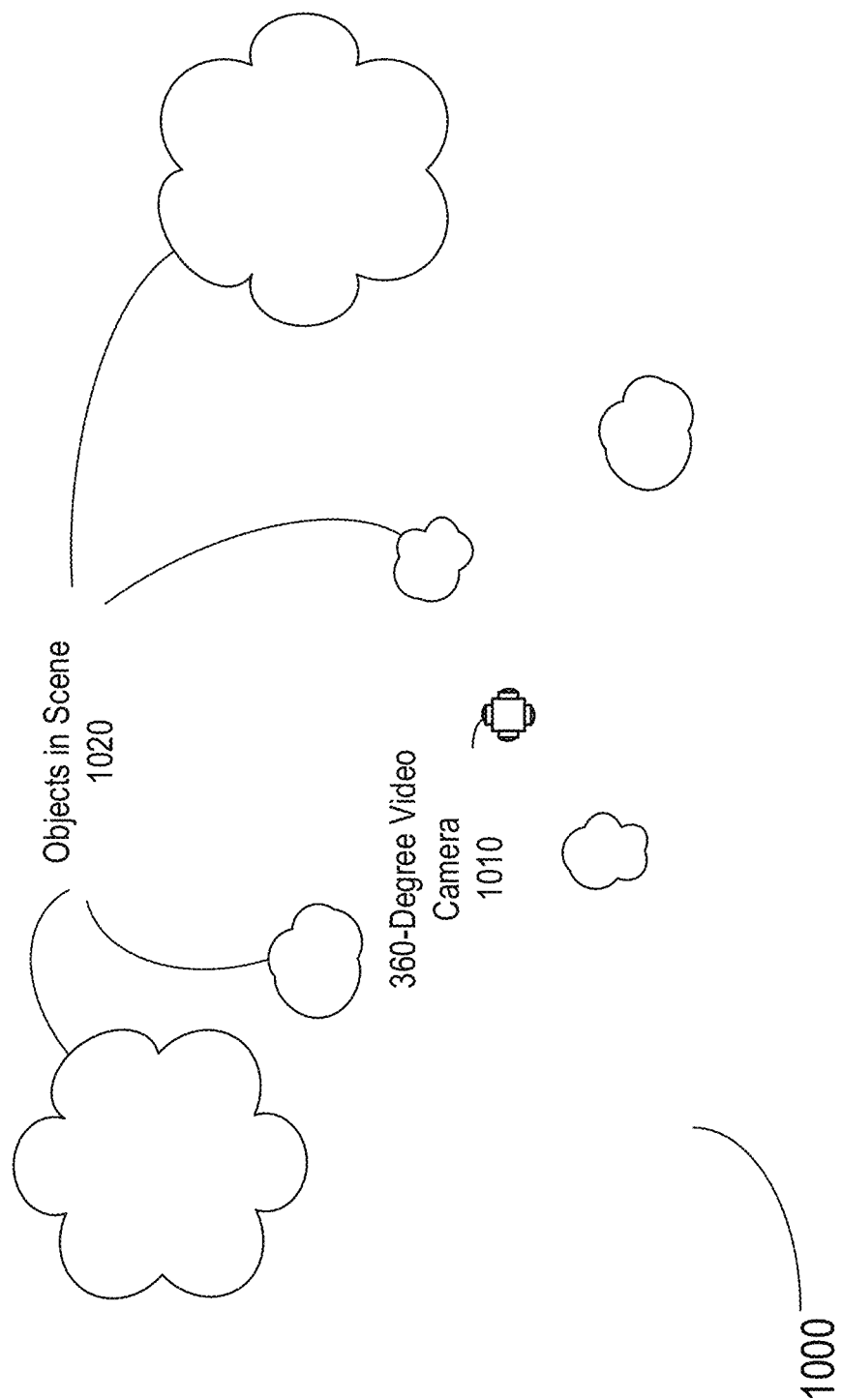
FIG. 10 is a schematic plan view of a scene being captured by a 360-degree depth camera in accordance with one or more embodiments.

FIG. 10 is a plan view of a scene 1000 as a wooded area being captured with a 360-degree video camera 1010, which may be a camera capable of capturing depth information of objects in scene 1020. Using embodiments described herein, a viewer client device may negotiate with a server for the number of layers to be delivered to the client device.

Figure 11:
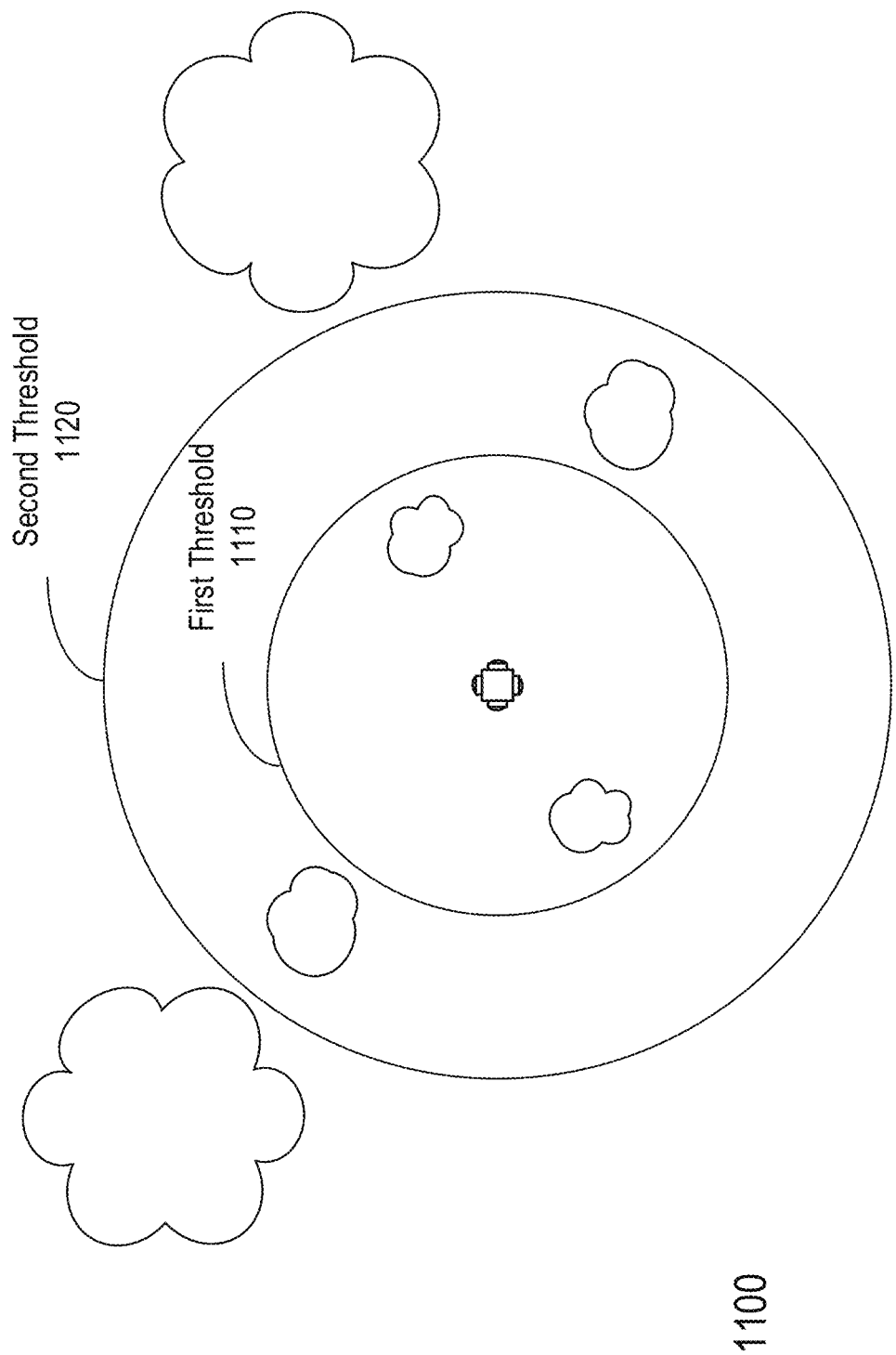
FIG. 11 is a plan view of the scene of FIG. 10 further illustrating depth thresholds implemented by a content server in accordance with one or more embodiments.

Referring now to FIG. 11, scene 1100 illustrates thresholds 1110 and 1120 provided by a client viewer device indicating that the client device can accept three layers of video to view the content of FIG. 10.

In response, the content provider in this example applies thresholding to divide the content into three depth layers. The thresholds 1110 and 1120 are illustrated as concentric circles. The objects inside the first threshold are assigned to the first video layer. The objects between the first and second thresholds 1110 and 1120 are assigned to the second layer. The objects outside the second threshold 1120 are assigned to the third layer.

Figure 12:
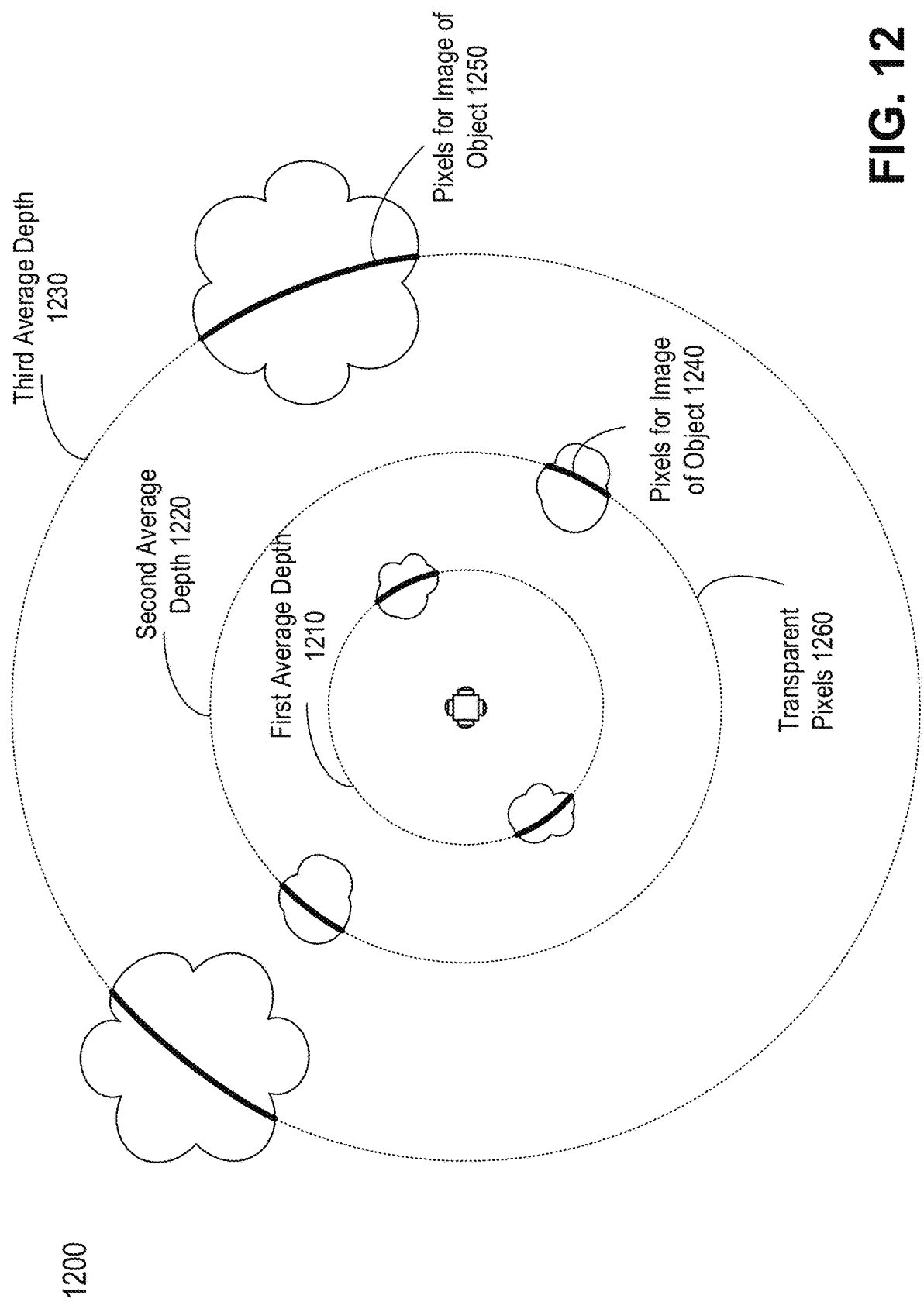
FIG. 12 schematically illustrates generation of a plurality of spherical videos representing three different depth layers using the scene and thresholds of FIGS. 10 and 11 in accordance with one or more embodiments.

Referring now to FIG. 12, scene 1200 is shown in which each layer is associated with a depth, which may be an average depth of objects within the layer. Thus, first average depth 1210 is shown and second average depth 1220 is shown, and third average depth 1230 is shown. A separate 360-degree video is generated for each depth layer. Objects within a layer are represented by pixels, such as pixels for image of object 1240 and pixels for image of object 1250, that correspond to an image of the object as projected onto a sphere with a radius equal to the depth associated with the layer (e.g. the average depth). Pixels within each video layer that do not correspond to any object within that video layer may be marked as transparent, such as transparent pixels 1260. Methods for identifying transparent pixels include using a bit mask, chroma keying, or other techniques, which will be appreciated by one of ordinary skill in the art. In some embodiments, no pixels in the outermost layer are marked as transparent. In the schematic illustration of FIG. 12, portions segments of each layer that correspond to pixels representing an object within that layer are illustrated with solid dark lines, such pixels 1240 and 1250.

Figure 13:
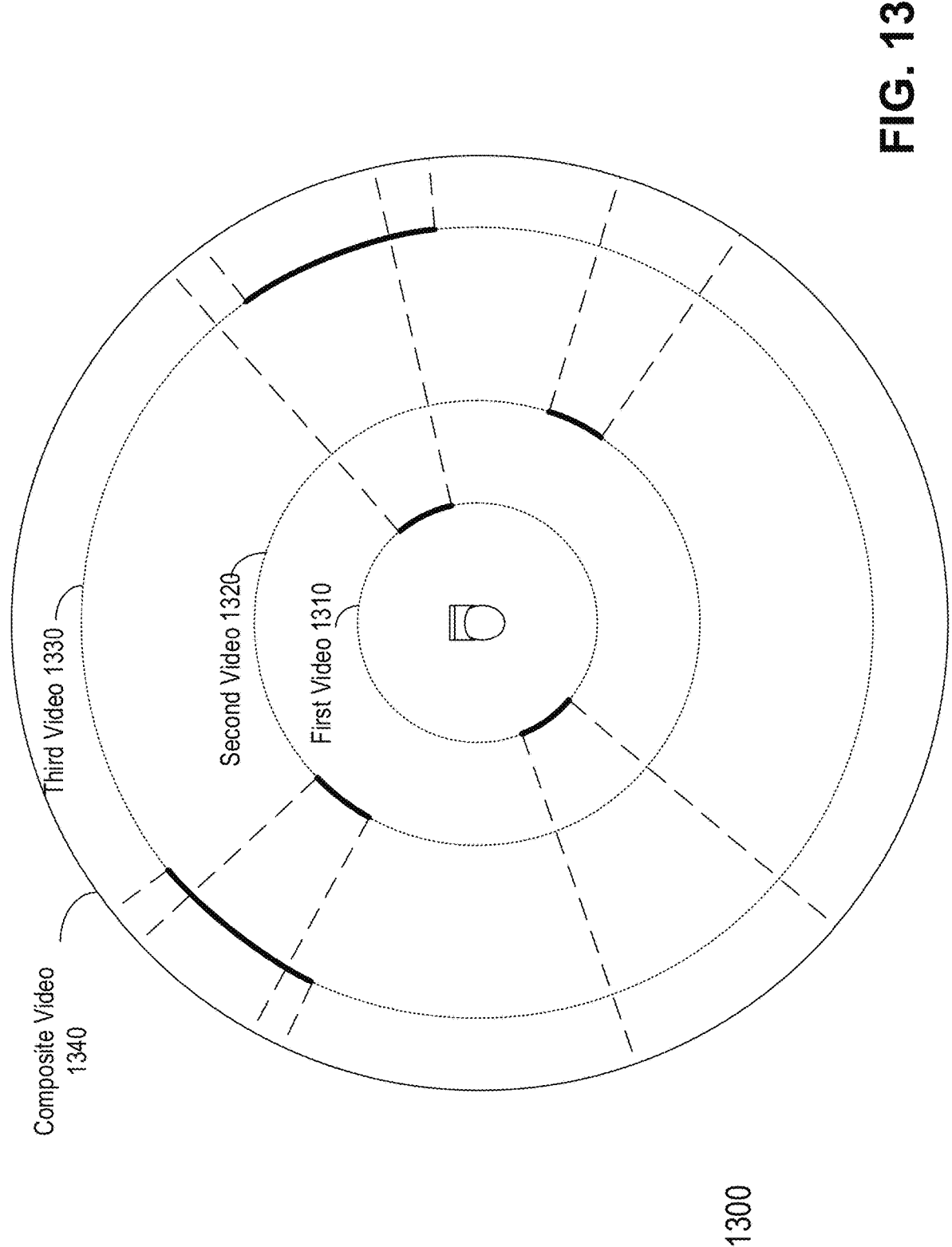
FIG. 13 is a plan view schematically illustrating generation of a composite video at the client side using the spherical videos generated as described in FIG. 12 in accordance with one or more embodiments.

FIG. 13 schematically illustrates client-side processing and display of the video 1300 described in FIG. of FIGS. 10-13. Each of the three video layers 1310, 1320 and 1330 can be streamed to the client. In the example of FIG. 13, the content is displayed to the user as if the users viewpoint were the same as the position of the 360-degree video camera within the scene. Exemplary playback systems may default to a viewpoint position that is equivalent to the camera position. In the example of FIG. 13, the client device generates a single composite video 1340 from the three separate layers. To simulate the initial viewpoint, the pixel values in each layer are mapped to pixel values in a composite video 1340. The mapping is illustrated geometrically in FIG. 13, with the composite video being concentric with the users viewpoint and further concentric with the three video layers. In cases where pixels representing objects in different layers are mapped to the same area of the composite video, only the (non-transparent) pixels of the nearest layer are mapped to the composite video.

Figure 14:
FIG. 14 is a plan view schematically illustrating generation of a composite video at the client side using the spherical videos generated as described in FIG. 12 in accordance with one or more embodiments.

FIG. 14 schematically illustrates a process of generating a composite video 1440 similar to that shown in FIG. 13, except that the user's viewpoint has been translated (forward and slightly to the right) as detected by the user's HMD. In real time, the client device adapts the geometry of the mapping used to generate the composite video. In the mapping of FIG. 14, the users viewpoint is concentric with the sphere of the composite video 1440, but the users position is now offset with respect to the centers of the first, second, and third spherical videos. The first 1410, second 1420, and third 1430 spherical videos remain concentric. In both FIGS. 13 and 14, the mapping from each of the video layers to the composite video 1340 and 1440 may be understood as a projection from the current viewpoint of the user onto a sphere representing the composite video. The viewpoint of the user may move with respect to the video depth layers, but the viewpoint remains at the center of the composite video.

Figure 15:
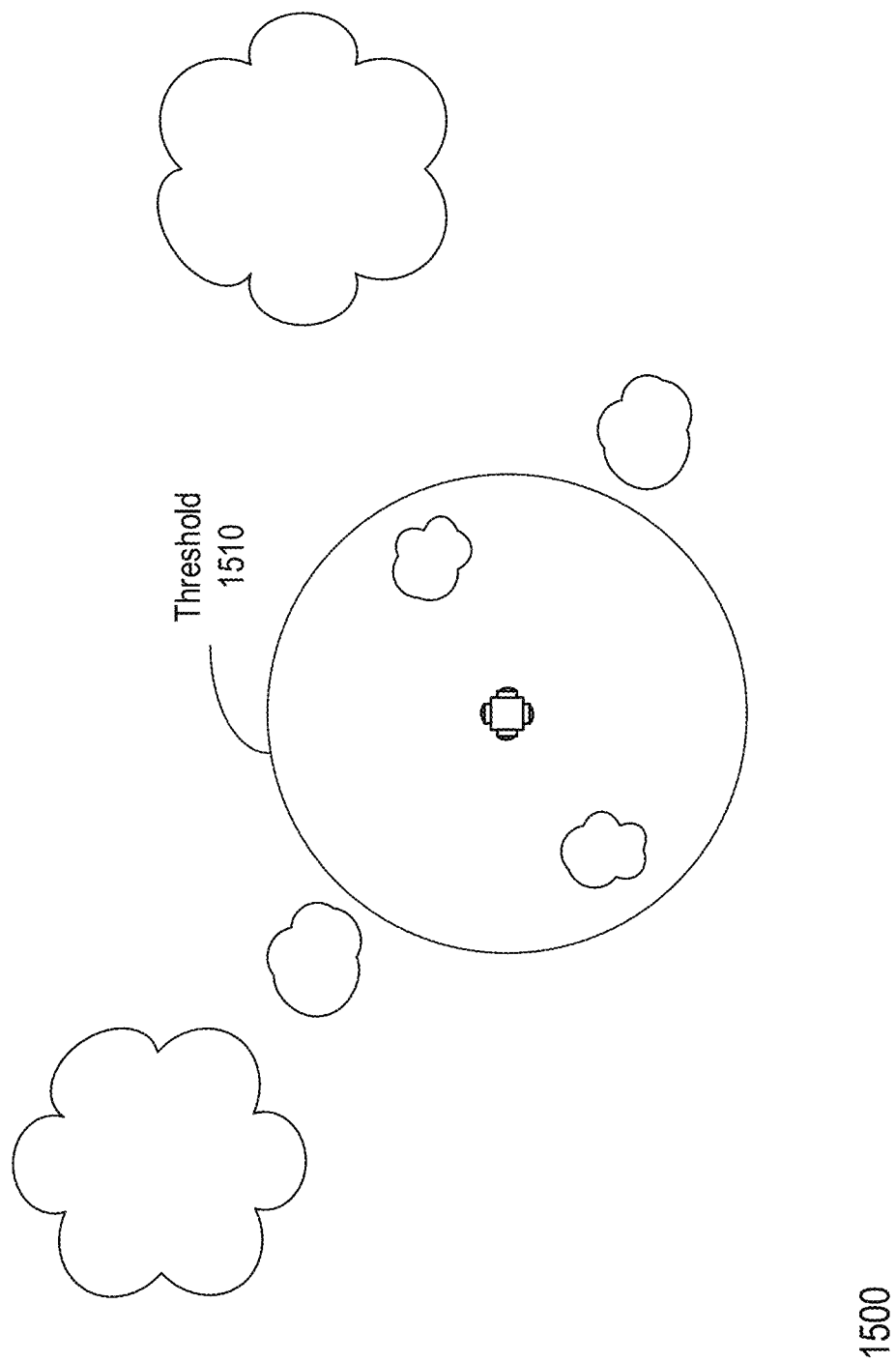
FIG. 15 is a plan view of the scene of FIG. 10 further illustrating a depth threshold implemented by a content server in accordance with one or more embodiments.
Figure 16:
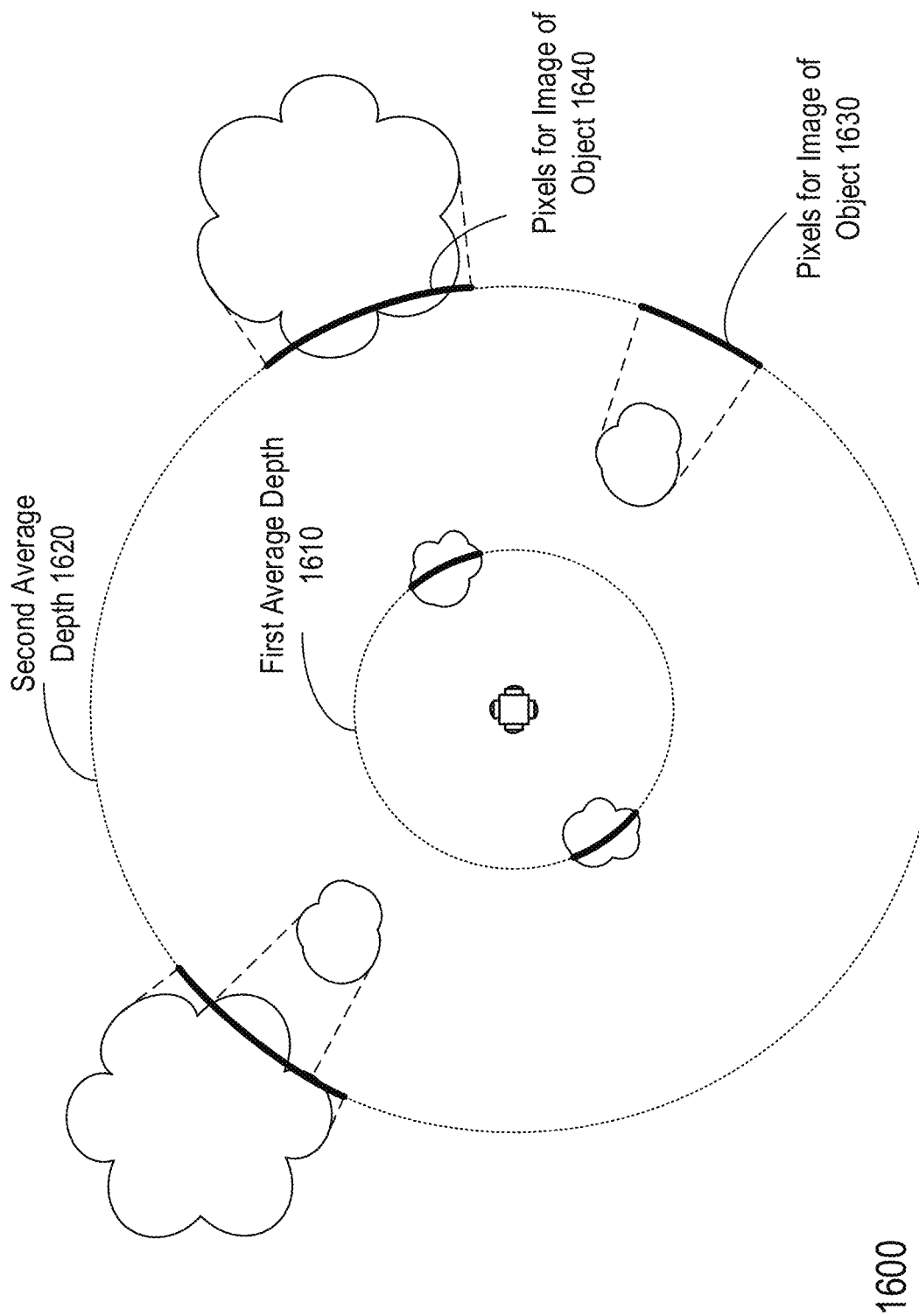
FIG. 16 schematically illustrates generation of spherical videos representing two different depth layers using the threshold of FIG. 15 in accordance with one or more embodiments.

In some cases, a client device may not have sufficient processing power or bandwidth available to process and display a video generated from three depth layers. FIG. 15 is a plan view of the scene of FIG. 10 in a case where the client has indicated that it can process only two layers. In this embodiment, only a single threshold 1510 is used to divide the scene into two layers. A server of the content provider operates to determine a depth of each layer such as layer, which may be an average depth of objects within the layer. As illustrated in scene 1600 of FIG. 16, the objects within each layer 1610 and 1620 are mapped to pixels 1630 and 1640 of the corresponding video layer. Thus, in FIG. 16, The two spherical videos separated by first average depth layer 1610 and second average depth layer 1620 are generated and may be delivered to the client device and used to generate a composite video with simulated motion parallax using the mapping techniques illustrated with respect to FIGS. 13 and 14.

The use of the systems and methods described in embodiments herein are not necessarily constrained for use only in the case of 360-degree video. In some embodiments, conventional (e.g. rectangular) video may be divided into a plurality of depth layer videos, and these depth layers may be processed at the client side to generate a single composite video based on tracking of the user's head position. In some such embodiments, the composite video may be displayed on a conventional video display (rather than an HMD), and the user's head position may be monitored using, e.g., a Kinect or depth camera system.

As described above in greater detail, some portions of an object may be visible from one viewpoint but invisible from another viewpoint. In some embodiments, images of such portions are obtained by capturing video from more than one viewpoint (e.g. using a light field or stereoscopic camera) so that at least one viewpoint captures otherwise hidden portions of an object or a background. In other embodiments, "hidden" portions of an object or background may be reconstructed algorithmically by extrapolating from portions of the background or object that are not hidden.

In some embodiments, an initially-captured video is divided by a content server into a selected number of depth layers in response to client selection of the number of layers. In other embodiments, the content server generates a plurality of representations of the content using different numbers of depth layers. For example, the content server may generate in advance a first representation of a video using two depth layers and a second representation of the video using three depth layers. The content server may send a selected one of those representations to a client based on the client's indication of how many layers the client is able to support based on the client's processing power and current network conditions.

Exemplary Processing Hardware.

Note that various hardware elements of one or more of the described embodiments are referred to as "modules" that carry out (i.e., perform, execute, and the like) various functions that are described herein in connection with the respective modules. As used herein, a module includes hardware (e.g., one or more processors, one or more microprocessors, one or more microcontrollers, one or more microchips, one or more application-specific integrated circuits (ASICs), one or more field programmable gate arrays (FPGAs), one or more memory devices) deemed suitable by those of skill in the relevant art for a given implementation. Each described module may also include instructions executable for carrying out the one or more functions described as being carried out by the respective module, and it is noted that those instructions could take the form of or include hardware (i.e., hardwired) instructions, firmware instructions, software instructions, and/or the like, and may be stored in any suitable non-transitory computer-readable medium or media, such as commonly referred to as RAM, ROM, etc.

Exemplary embodiments disclosed herein are implemented using one or more wired and/or wireless network nodes, such as a wireless transmit/receive unit (WTRU) or other network entity.

Figure 17:
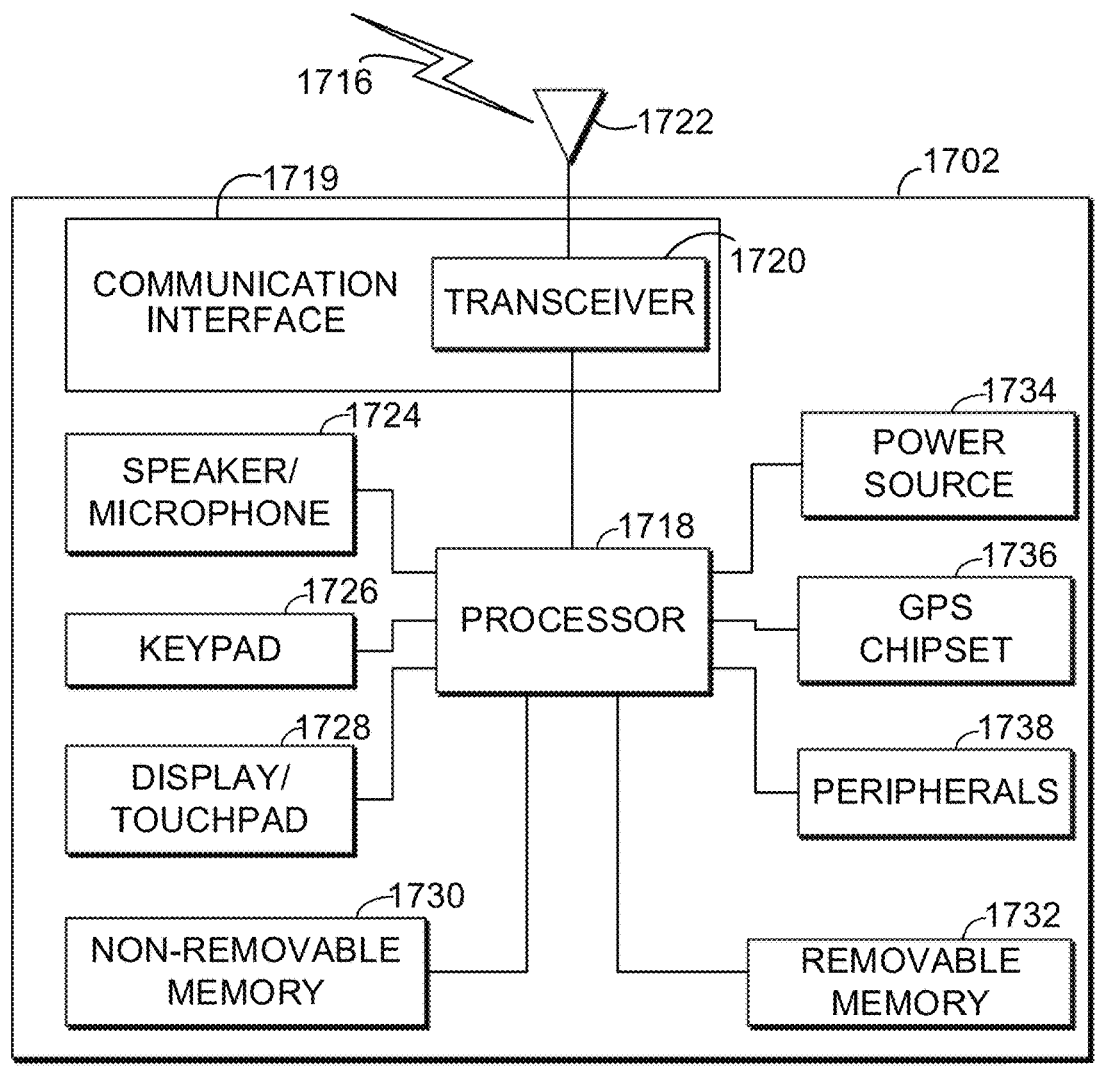
FIG. 17 illustrates an exemplary wireless transmit/receive unit (WTRU) that may be employed as a client viewer device in some embodiments.

FIG. 17 is a system diagram of an exemplary WTRU 1702, which may be employed as a viewer client device in embodiments described herein. As shown in FIG. 17, the WTRU 1702 may include a processor 1718, a communication interface 1719 including a transceiver 1720, a transmit/receive element 1722, a speaker/microphone 1724, a keypad 1726, a display/touchpad 1728, a non-removable memory 1730, a removable memory 1732, a power source 1734, a global positioning system (GPS) chipset 1736, and sensors 1738. It will be appreciated that the WTRU 1702 may include any sub-combination of the foregoing elements while remaining consistent with an embodiment.

The processor 1718 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 1718 may perform signal coding, data processing, power control, input/output processing, and/or any other functionality that enables the WTRU 1702 to operate in a wireless environment. The processor 1718 may be coupled to the transceiver 1720, which may be coupled to the transmit/receive element 1722. While FIG. 17 depicts the processor 1718 and the transceiver 1720 as separate components, it will be appreciated that the processor 1718 and the transceiver 1720 may be integrated together in an electronic package or chip.

The transmit/receive element 1722 may be configured to transmit signals to, or receive signals from, a base station over the air interface 1716. For example, in one embodiment, the transmit/receive element 1722 may be an antenna configured to transmit and/or receive RF signals. In another embodiment, the transmit/receive element 1722 may be an emitter/detector configured to transmit and/or receive IR, UV, or visible light signals, as examples. In yet another embodiment, the transmit/receive element 1722 may be configured to transmit and receive both RF and light signals. It will be appreciated that the transmit/receive element 1722 may be configured to transmit and/or receive any combination of wireless signals.

In addition, although the transmit/receive element 1722 is depicted in FIG. 17 as a single element, the WTRU 1702 may include any number of transmit/receive elements 1722. More specifically, the WTRU 1702 may employ MIMO technology. Thus, in one embodiment, the WTRU 1702 may include two or more transmit/receive elements 1722 (e.g., multiple antennas) for transmitting and receiving wireless signals over the air interface 1716.

The transceiver 1720 may be configured to modulate the signals that are to be transmitted by the transmit/receive element 1722 and to demodulate the signals that are received by the transmit/receive element 1722. As noted above, the WTRU 1702 may have multi-mode capabilities. Thus, the transceiver 1720 may include multiple transceivers for enabling the WTRU 1702 to communicate via multiple RATs, such as UTRA and IEEE 802.11, as examples.

The processor 1718 of the WTRU 1702 may be coupled to, and may receive user input data from, the speaker/microphone 1724, the keypad 1726, and/or the display/touchpad 1728 (e.g., a liquid crystal display (LCD) display unit or organic light-emitting diode (OLED) display unit). The processor 1718 may also output user data to the speaker/microphone 1724, the keypad 1726, and/or the display/touchpad 1728. In addition, the processor 1718 may access information from, and store data in, any type of suitable memory, such as the non-removable memory 1730 and/or the removable memory 1732. The non-removable memory 1730 may include random-access memory (RAM), read-only memory (ROM), a hard disk, or any other type of memory storage device. The removable memory 1732 may include a subscriber identity module (SIM) card, a memory stick, a secure digital (SD) memory card, and the like. In other embodiments, the processor 1718 may access information from, and store data in, memory that is not physically located on the WTRU 1702, such as on a server or a home computer (not shown).

The processor 1718 may receive power from the power source 1734, and may be configured to distribute and/or control the power to the other components in the WTRU 1702. The power source 1734 may be any suitable device for powering the WTRU 1702. As examples, the power source 1734 may include one or more dry cell batteries (e.g., nickel-cadmium (NiCd), nickel-zinc (NiZn), nickel metal hydride (NiMH), lithium-ion (Li-ion), and the like), solar cells, fuel cells, and the like.

The processor 1718 may also be coupled to the GPS chipset 1736, which may be configured to provide location information (e.g., longitude and latitude) regarding the current location of the WTRU 1702. In addition to, or in lieu of, the information from the GPS chipset 1736, the WTRU 1702 may receive location information over the air interface 1716 from a base station and/or determine its location based on the timing of the signals being received from two or more nearby base stations. It will be appreciated that the WTRU 1702 may acquire location information by way of any suitable location-determination method while remaining consistent with an embodiment.

The processor 1718 may further be coupled to other peripherals 1738, which may include one or more software and/or hardware modules that provide additional features, functionality and/or wired or wireless connectivity. For example, the peripherals 1738 may include sensors such as an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 18:
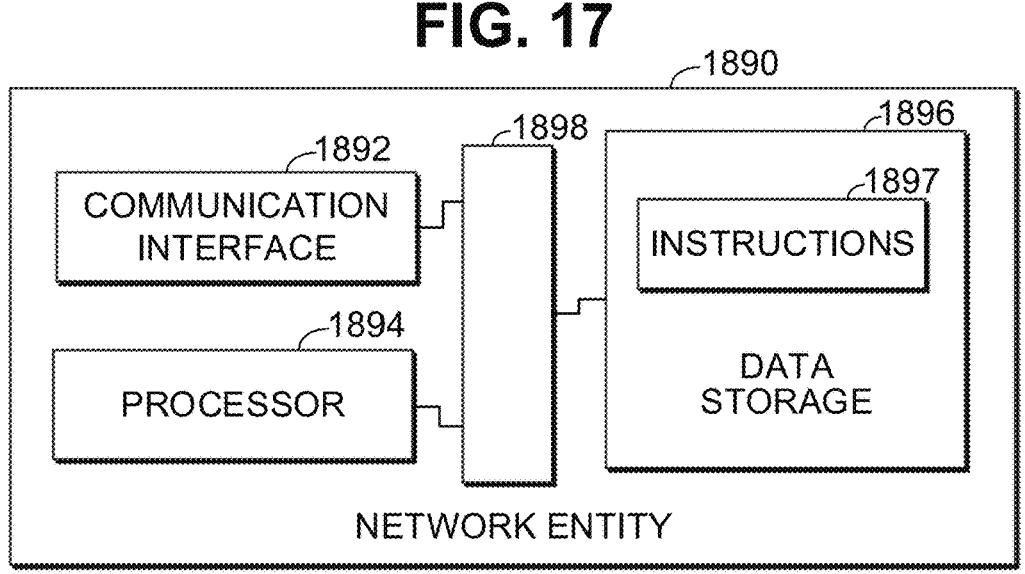
FIG. 18 illustrates an exemplary network entity that may be employed as a content server in some embodiments.

FIG. 18 depicts an exemplary network entity 1890 that may be used in embodiments of the present disclosure, for example as a content server. As depicted in FIG. 18, network entity 1890 includes a communication interface 1892, a processor 1894, and non-transitory data storage 1896, all of which are communicatively linked by a bus, network, or other communication path 1898.

Communication interface 1892 may include one or more wired communication interfaces and/or one or more wireless-communication interfaces. With respect to wired communication, communication interface 1892 may include one or more interfaces such as Ethernet interfaces, as an example. With respect to wireless communication, communication interface 1892 may include components such as one or more antennae, one or more transceivers/chipsets designed and configured for one or more types of wireless (e.g., LTE) communication, and/or any other components deemed suitable by those of skill in the relevant art. And further with respect to wireless communication, communication interface 1892 may be equipped at a scale and with a configuration appropriate for acting on the network side—as opposed to the client side—of wireless communications (e.g., LTE communications, Wi-Fi communications, and the like). Thus, communication interface 1892 may include the appropriate equipment and circuitry (perhaps including multiple transceivers) for serving multiple mobile stations, UEs, or other access terminals in a coverage area.

Processor 1894 may include one or more processors of any type deemed suitable by those of skill in the relevant art, some examples including a general-purpose microprocessor and a dedicated DSP.

Data storage 1896 may take the form of any non-transitory computer-readable medium or combination of such media, some examples including flash memory, read-only memory (ROM), and random-access memory (RAM) to name but a few, as any one or more types of non-transitory data storage deemed suitable by those of skill in the relevant art could be used. As depicted in FIG. 18, data storage 1896 contains program instructions 1897 executable by processor 1894 for carrying out various combinations of the various network-entity functions described herein.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method of producing video content, the method comprising:
    obtaining a three-dimensional source video;
    based on information received from a client device, determining a selected number of depth layers;
    producing, from the three-dimensional source video, a plurality of video streams corresponding to the selected number of depth layers, wherein each video stream is associated with at least one respective depth value, and wherein each video stream includes regions of the source video having depth values corresponding to the respective associated depth value; and
    sending the plurality of video streams to the client device.

2. The method of claim 1, wherein the at least one respective depth value associated with each video stream is a range of depth values.

3. The method of claim 1, further comprising sending, to the client device, information identifying at least one associated depth value for each of the plurality of video streams.

4. The method of claim 3, wherein the associated depth value of each video stream is an average depth value.

5. The method of claim 1, wherein each of the video streams is a 360-degree video.

6. The method of claim 1, wherein the three-dimensional source video is a 360-degree video.

7. The method of claim 1, wherein the determining the selected number of depth layers based on information received from a client device comprises receiving the selected number of layers from the client device.

8. The method of claim 1, wherein the determining the selected number of depth layers based on information received from a client device comprises selecting the number of layers based at least in part on network conditions reported by the client device.

9. The method of claim 1, wherein the determining the selected number of depth layers based on information received from a client device comprises selecting the number of layers based at least in part on processing capabilities of the client device.

10. The method of claim 1, wherein the determining the selected number of depth layers based on information received from a client device comprises negotiating the number of layers with the client device.

11. The method of claim 1, wherein the three-dimensional source video is obtained at least in part by one or more of a depth camera and a light field camera capturing the three-dimensional source video.

12. The method of claim 1, further comprising sending to the client device a bit mask identifying transparent regions of at least one of the depth layers.

13. A method of displaying video content at a client device, the method comprising:
    negotiating a selected number of depth layers with a content server, wherein the selected number of layers depends at least in part on network conditions of communication with the content server;
    receiving a number of video streams corresponding to the selected number of depth layers;
    tracking a head position of a user of the client device;
    mapping the video streams to a composite video according to the head position; and
    displaying the composite video.

14. The method of claim 13, further comprising receiving an associated depth for each of the video streams, wherein the mapping is further based on the respective associated depths.

15. The method of claim 13, wherein at least a portion of content in a first video stream is scaled up in size so as to obscure additional content in a second video stream.

16. The method of claim 13, wherein the selected number of depth layers is determined at least in part by processing capabilities of the client device.

17. The method of claim 13, wherein the video streams are 360-degree video streams.

18. The method of claim 13, wherein the composite video is a 360-degree video stream.

19. A content server comprising:
    a processor and a non-transitory computer-readable medium storing instructions operative to perform functions comprising:
    obtaining a three-dimensional source video;
    based on information received from a client device, determining a selected number of depth layers;
    producing, from the three-dimensional source video, a plurality of video streams corresponding to the selected number of depth layers, wherein each video stream is associated with at least one respective depth value, and wherein each video stream comprises regions of the source video having depth values corresponding to the respective associated depth value; and
    sending the plurality of video streams to the client device.

20. The content server of claim 19, wherein the client device is a virtual reality display.

\* \* \* \* \*